(12) United States Patent
Kumar et al.

(10) Patent No.: US 9,879,797 B2
(45) Date of Patent: Jan. 30, 2018

(54) SOLENOID-ACTUATED FLUID CONTROL VALVE ASSEMBLY

(71) Applicants: Viraraghavan S. Kumar, Melbourne, FL (US); Alvaro Andres Reyes, Fort Lauderdale, FL (US); Sudhir S. Kulkarni, Rockledge, FL (US); Shailesh Pradhananga, Rockledge, FL (US)

(72) Inventors: Viraraghavan S. Kumar, Melbourne, FL (US); Alvaro Andres Reyes, Fort Lauderdale, FL (US); Sudhir S. Kulkarni, Rockledge, FL (US); Shailesh Pradhananga, Rockledge, FL (US)

(73) Assignee: IQ VALVES, CO., Melbourne, FL (US)

( * ) Notice: Subject to any disclaimer, the term of this patent is extended or adjusted under 35 U.S.C. 154(b) by 0 days.

(21) Appl. No.: 14/683,809

(22) Filed: Apr. 10, 2015

(65) Prior Publication Data
US 2016/0298784 A1  Oct. 13, 2016

(51) Int. Cl.
*F16K 31/06* (2006.01)
*F16K 11/044* (2006.01)

(52) U.S. Cl.
CPC ........ *F16K 31/0603* (2013.01); *F16K 11/044* (2013.01); *F16K 31/0606* (2013.01); *F16K 31/0627* (2013.01); *Y10T 137/8671* (2015.04); *Y10T 137/86574* (2015.04); *Y10T 137/86614* (2015.04)

(58) Field of Classification Search
CPC ....... Y10T 137/8671; Y10T 137/86614; Y10T 137/86574; F16K 31/0603; F16K 11/02
USPC .............. 137/625.69, 625.2, 625.64, 625.68; 251/129.15, 129.21
See application file for complete search history.

(56) References Cited

U.S. PATENT DOCUMENTS 5,083,747 A * 1/1992 Schmitt-Matzen ... B60T 8/3635
    137/625.65
5,992,461 A * 11/1999 Gilmore .................. H01F 7/081
    137/625.65

* cited by examiner

*Primary Examiner* — Kevin Murphy
*Assistant Examiner* — Kelsey Cary
(74) *Attorney, Agent, or Firm* — The Bilicki Law Firm, PC

(57) ABSTRACT

A valve assembly includes a valve base having a tubular section with a longitudinal bore formed therein, a fluid inlet port and a common port with an internal passageway therebetween. A solenoid coil is adapted to generate a magnetic flux and includes a longitudinal axis and a bore coaxial therewith. The valve assembly further includes an orifice piece positioned within the longitudinal bore of the valve base. The orifice piece includes a central passageway with a first end and a second end. A plunger is movable within the longitudinal bore between a first de-actuated position and a second actuated position.

18 Claims, 19 Drawing Sheets

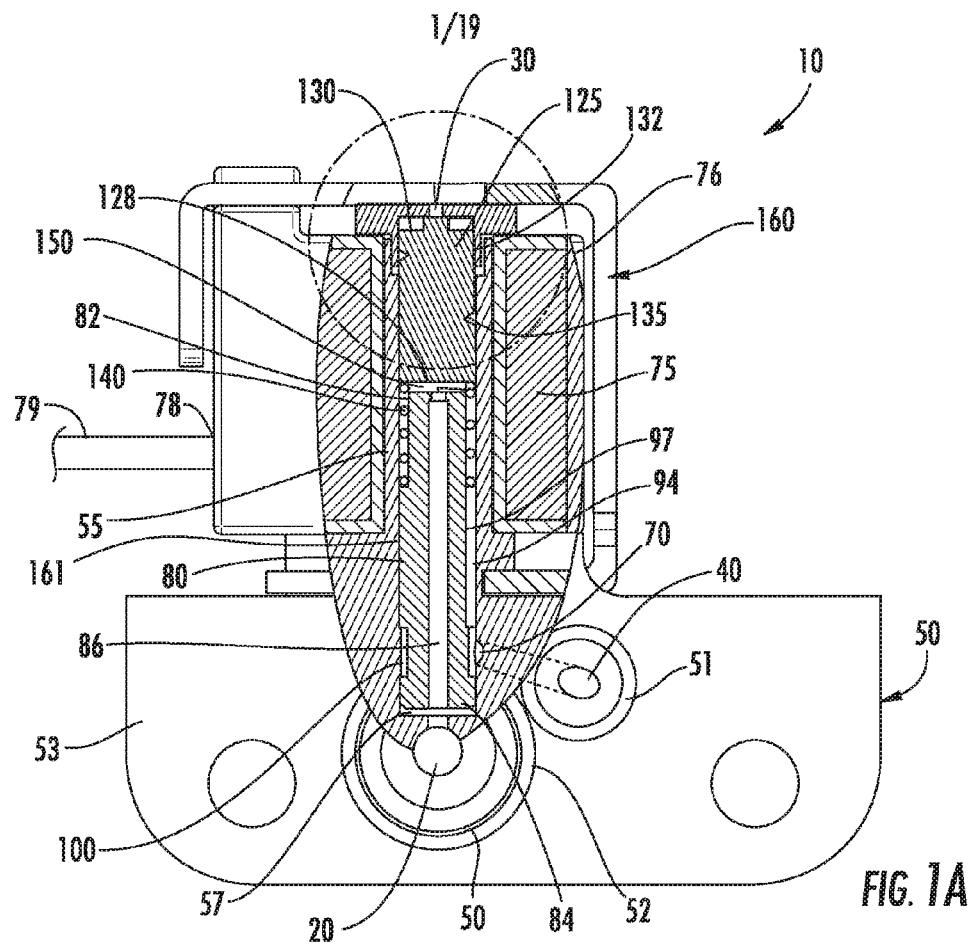
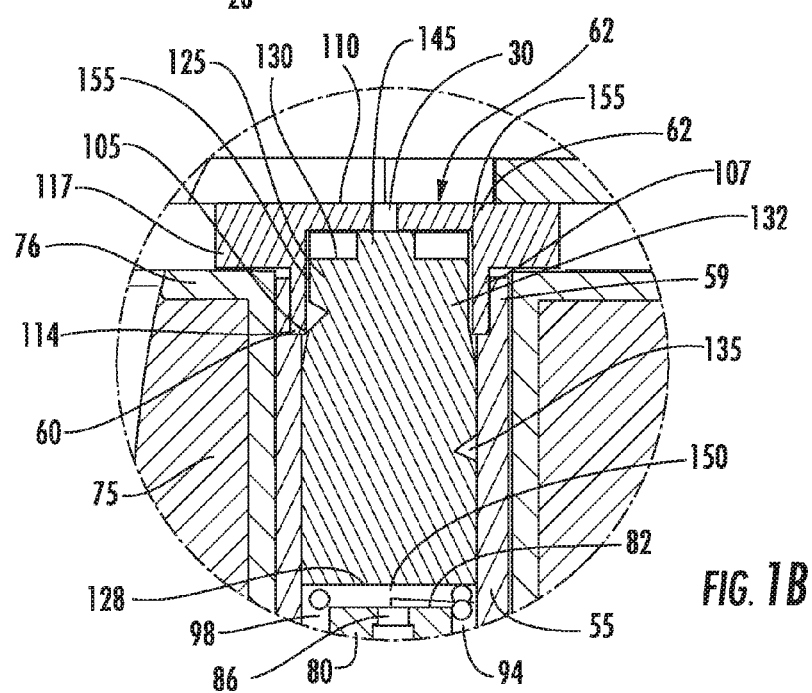

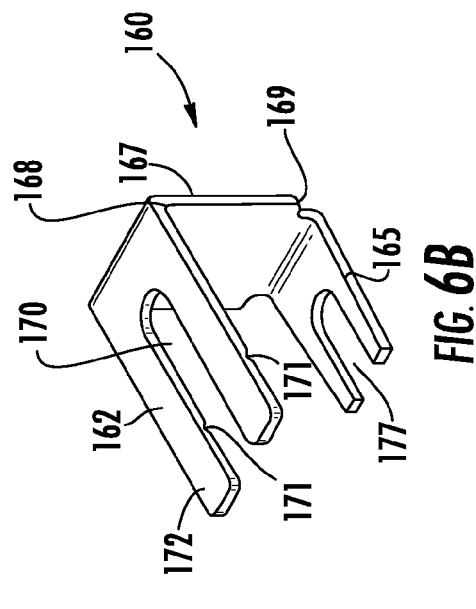
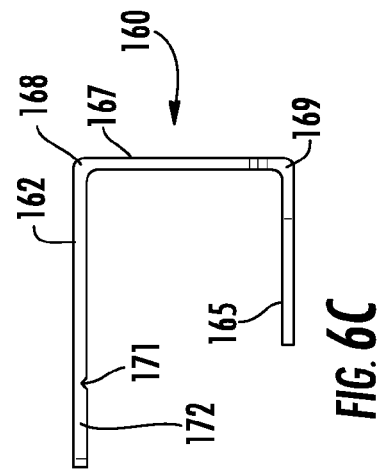
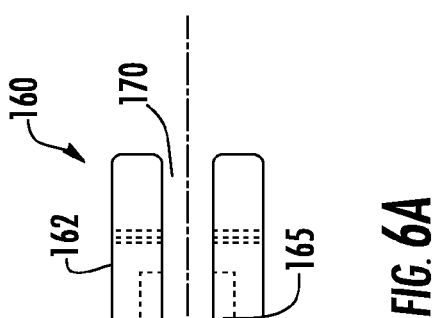
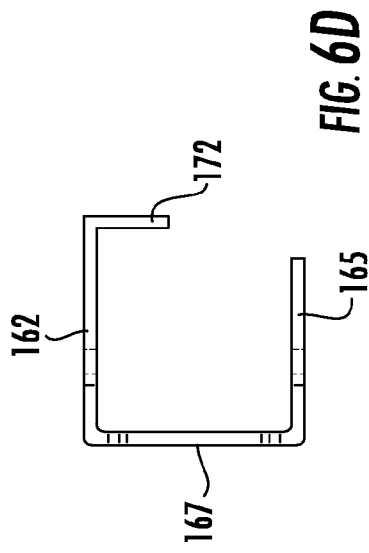
FIG. 6A
FIG. 6B
FIG. 6C
FIG. 6D

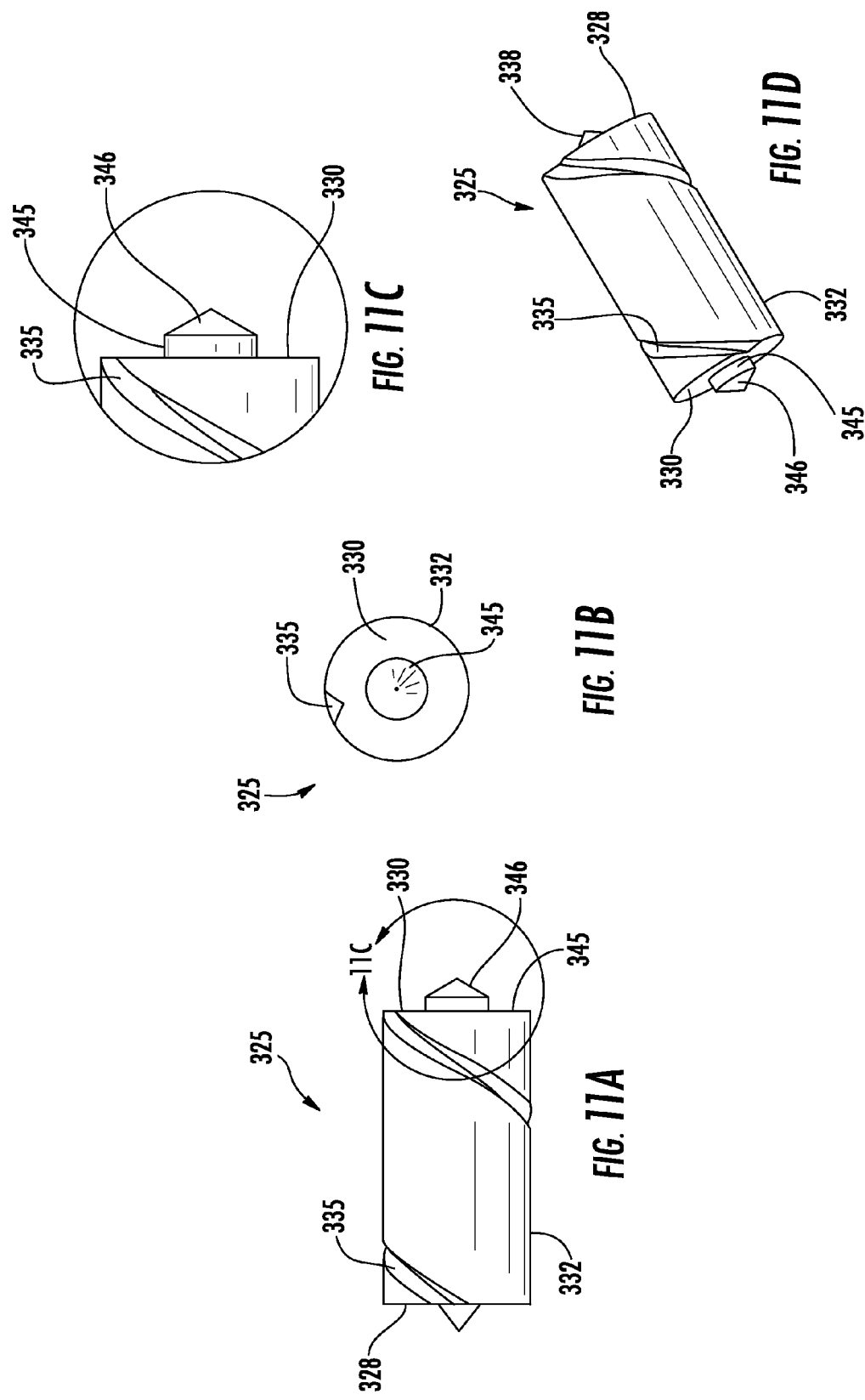

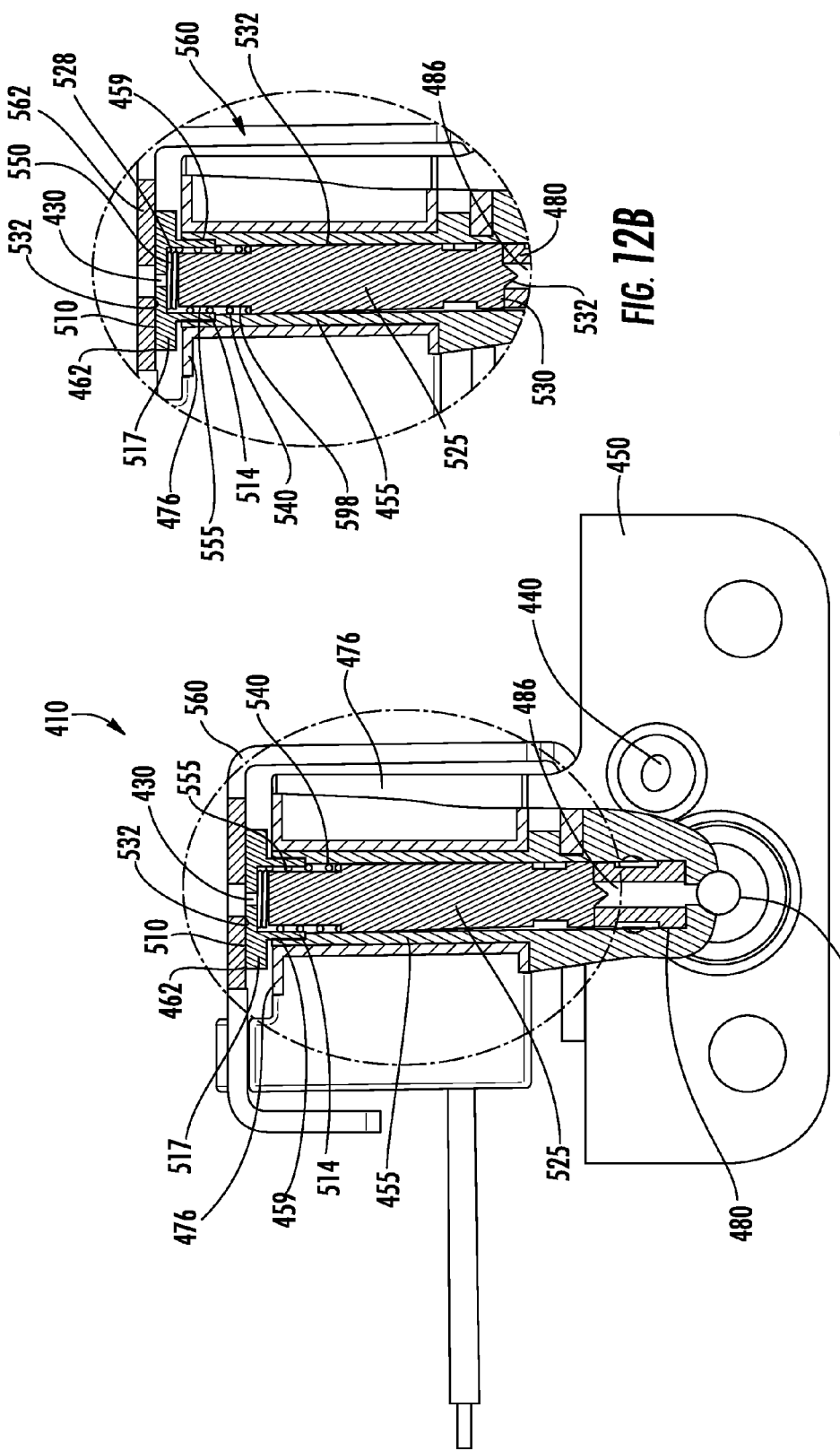

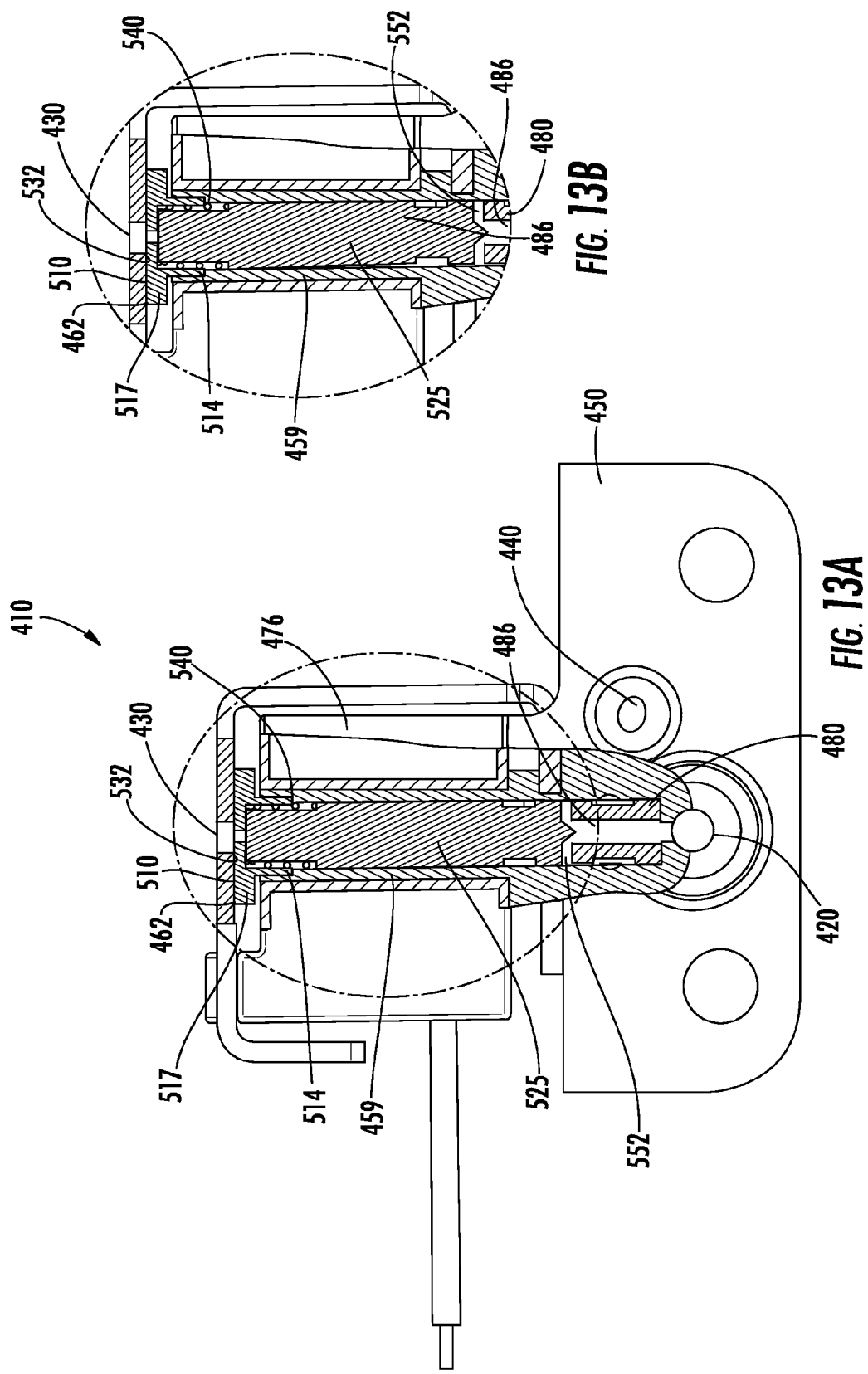

SOLENOID-ACTUATED FLUID CONTROL VALVE ASSEMBLY

FIELD OF INVENTION

The present application relates in general to solenoid-actuated fluid control valves for use in fluid flow regulation systems, such as those that require precise control of the rate of fluid flow, including but not limited to pneumatic and hydraulic regulation.

BRIEF DESCRIPTION OF THE DRAWINGS

FIG. 1a is a cross-sectional illustration of a three-way proportional solenoid-controlled fluid valve assembly in a de-actuated state according to one embodiment of the invention.

FIG. 1b is an enlarged cross-sectional illustration of the three-way proportional solenoid-controlled fluid valve assembly of FIG. 1a.

FIG. 2b is an enlarged cross-sectional illustration of the three-way proportional solenoid-controlled fluid valve assembly of FIG. 2a.

FIG. 6a is a top view of a flux conductor.
FIG. 6b is a perspective view of a flux conductor.
FIG. 6c is a side view of a flux conductor.
FIG. 6d illustrates the flux conductor bent as in an assembled configuration.

FIG. 9b is an enlarged cross-sectional illustration of the three-way solenoid-controlled fluid valve assembly of FIG. 9a.

FIG. 10b is an enlarged cross-sectional illustration of the three-way solenoid-controlled fluid valve assembly of FIG. 9a.

FIG. 11a is a side view of an alternate embodiment of a plunger.

FIG. 11b is a top view of the plunger of FIG. 11a.
FIG. 11c is an enlarged side view of the plunger.
FIG. 11d is a perspective view of the plunger.
FIG. 12a is a cross-sectional side view of a 3-way proportional valve.

FIG. 12b is a detail view of FIG. 12a.
FIG. 13a is a cross-sectional side view of the 3-way proportional valve in an open position.

FIG. 13b is an enlarged view of FIG. 13a.

FIG. 16b is a detail view of FIG. 16a.

SUMMARY

A three-way proportional valve assembly includes a valve base having a tubular section with a longitudinal bore formed therein, a fluid inlet port and a common port with an internal passageway therebetween. A solenoid coil is adapted to generate a magnetic flux and includes a longitudinal axis and a coaxial bore. The valve assembly further includes an orifice piece positioned within the longitudinal bore of the valve base. The orifice piece includes a central passageway with a first end and a second end. A channel is formed between an outer surface of the orifice piece and the longitudinal bore of the tubular section to allow fluid transfer from the central passageway at a first end of the orifice piece to the common port of the valve base. A magnetic top piece is positioned over a top open end of the tubular section and includes a top port formed therein. Further, a plunger having a first end, a second end, and a cylindrical outer surface is provided. The plunger is movable within the longitudinal bore between a first de-actuated position wherein the first end of the plunger closes the top port formed in the magnetic top piece and a second actuated position wherein the second end of the plunger contacts the orifice piece. A flux conductor is also provided to complete valve assembly. The valve assembly may also include a biasing member, such as a spring, positioned between the orifice piece and plunger for biasing the plunger so it closes the top port when the valve is in a de-actuated state.

DETAILED DESCRIPTION OF THE EMBODIMENTS

Figure 2A:
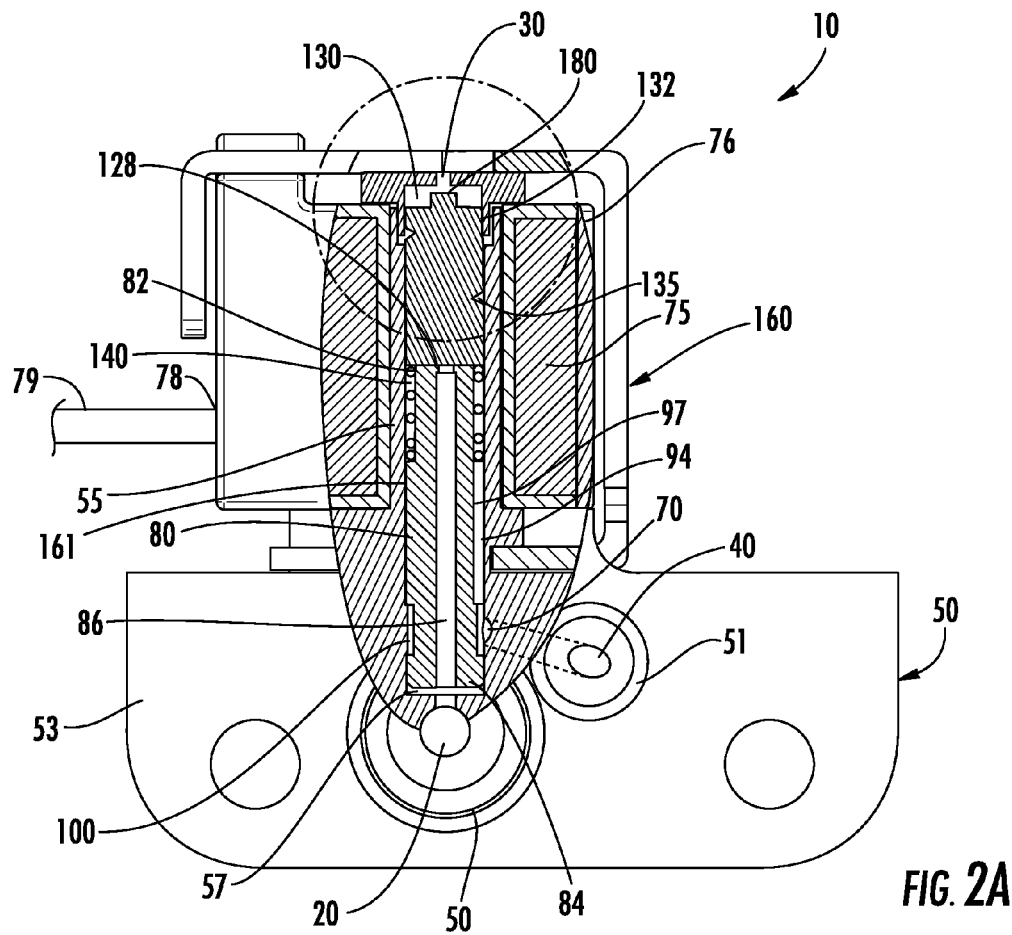
FIG. 2a is a cross-sectional illustration of a three-way proportional solenoid-controlled fluid valve assembly in an actuated state according to one embodiment of the invention.
Figure 2B:
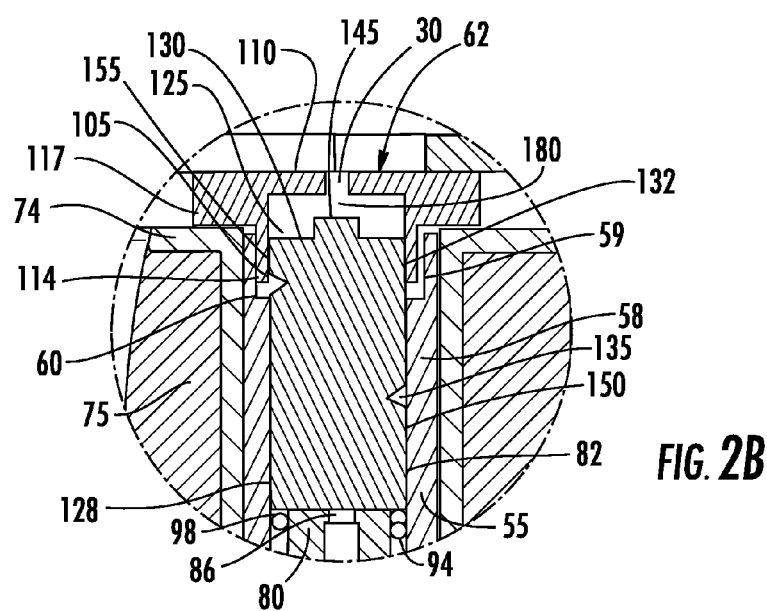

Initially with reference to FIGS. 1a-2b, a three-way proportional solenoid-controlled fluid valve assembly, hereinafter valve assembly 10, is illustrated according to an embodiment of the invention. FIGS. 1a and 1b illustrate a cross-sectional view and an enlarged cross-sectional view of valve assembly 10 in a de-actuated state. FIGS. 2a and 2b illustrate a cross-sectional view and an enlarged cross-sectional view of valve assembly 10 in an actuated state. Valve assembly 10 is a three-way proportional valve having three ports including inlet port 20 through which fluid enters valve assembly 10, top port 30 which is normally closed, and common port 40 which is normally open and common to inlet port 20 and top port 30.

In general, valve assembly 10 includes a valve base 50 having a body section 53 and tubular section 55 extending from body section 53 with a longitudinal bore 57 formed therein. Tubular section 55 includes an upwardly extending annular flange 59 and an annular ledge 60 for receiving a magnetic top piece 62. Inlet port 20 is formed in body section 53 and is in fluid communication with longitudinal bore 57 of tubular section 55. In addition, common port 40 is formed within body portion 53. Common port 40 is in fluid communication with longitudinal bore 57 via an internal passageway 70. Valve base 50 may be formed of plastic, aluminum, machined steel, or the like. Valve base 50 further includes raised rings, 51 and 52, around intake port 20 and common port 40. Raised rings 51, 52 act as O-rings to create a seal against the surface of valve base 50.

A solenoid coil 75 is supported on a housing 76 and is adapted to generate a magnetic flux. Solenoid coil 75, installed in housing 76, surround tubular section 55 of valve base 50. Housing 76 includes a through hole 77 (best shown in FIG. 7) and may be provided with a sidewall aperture or bore 78 for electrical leads 79 which supply an electrical connection between solenoid coil 75 and a current control source (not shown).

Figure 3A:
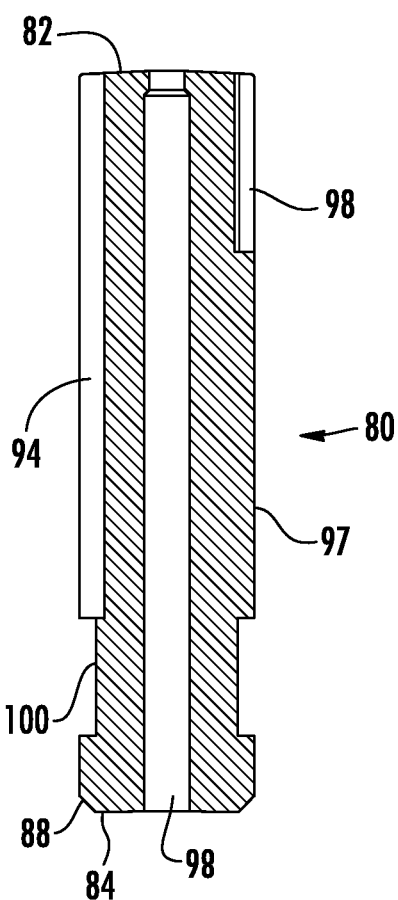
FIG. 3a is a cross-sectional view of an orifice piece.
Figure 3B:
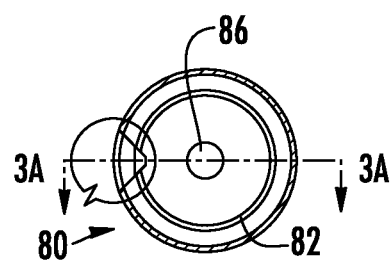
FIG. 3b is a top view of the orifice piece.

An orifice piece 80 (i.e. orifice) is positioned within longitudinal bore 57 of tubular section 55. In one embodiment, the orifice piece 80 may be snug-fitted within longitudinal bore 57 such as by press-fitting, threading, adhesive, or the like. As shown in detail in FIGS. 3a and 3b, orifice piece 80 includes a first end 82 and a second end 84 with a central passageway 86 formed therein. FIG. 3a is a cross-sectional view of orifice piece 80 and FIG. 3b is a top view of orifice piece 80. First end 82 may, in some embodiments, have a slightly convex or tapered surface, as shown in FIG. 3a, and second end 84 may include angled edges 88. In addition, a channel 94 is formed within an outer surface 97 of orifice piece 80 to allow for fluid transfer from central passageway 86 at first end 82 of orifice piece 80 to common port 40. Orifice piece 80 may further include a narrowed cylindrical section 98 formed at first end 82 and an annular depression 100 formed therein proximate to second end 84 to further facilitate fluid transfer to common port 40.

Figure 4A:
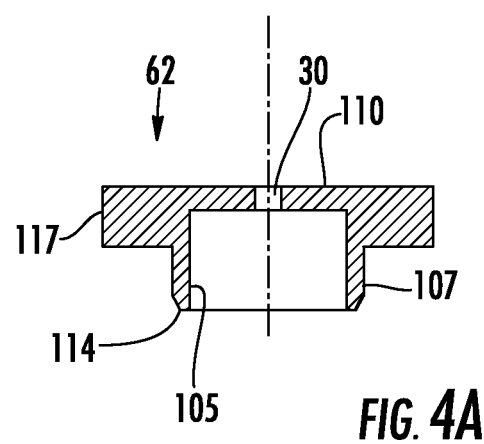
FIG. 4a is a cross-sectional view of magnetic top piece.
Figure 4B:
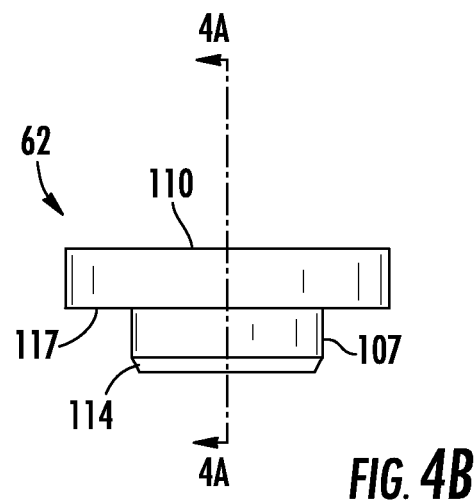
FIG. 4b is a side view of magnetic top piece.
Figure 4C:
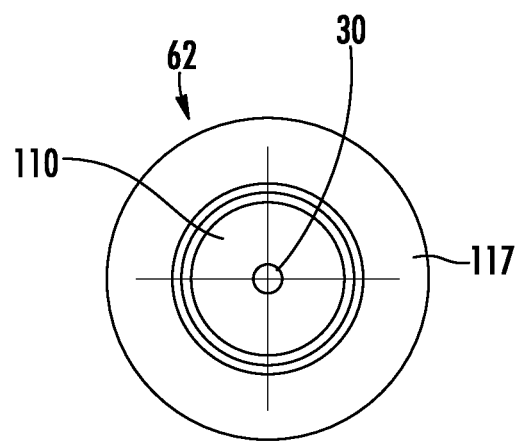
FIG. 4c is a bottom view of magnetic top piece.

Valve assembly 10 further includes magnetic top piece 62 positioned over tubular section 55 of valve base 50. One embodiment of magnetic top piece 62 is illustrated in detail in FIGS. 4a-4c. In general, magnetic top piece 62 is cylindrically shaped with an inner surface 105, an outer surface 107, and a top wall 110 with top port 30, which is normally closed, formed therein. Magnetic top piece 62 also includes a bottom rim 114 and a disk-shaped rim portion 117 extending from outer surface 107. Bottom rim 114 of magnetic top piece 62 is received within upwardly extending annular flange 59 of tubular section 55 of valve base 50.

Figure 5C:
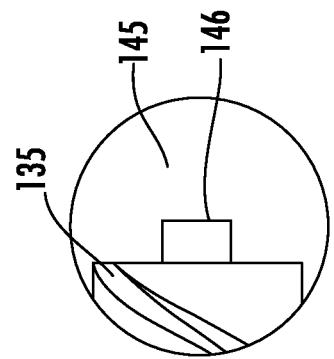
FIG. 5c is an enlarged side view of the plunger.
Figure 5B:
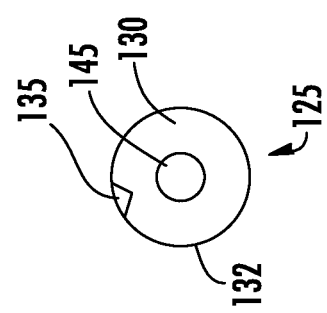
FIG. 5b is a top view of the plunger.
Figure 5A:
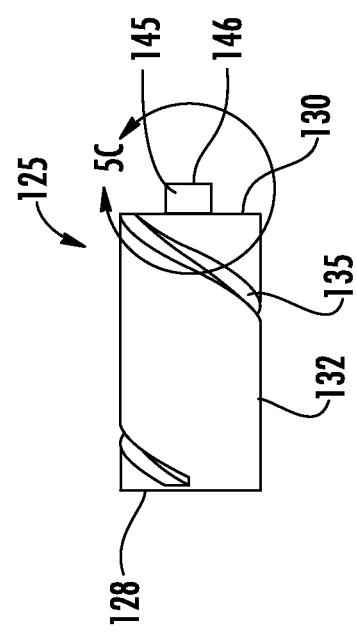
FIG. 5a is a side view of a plunger.

As illustrated in FIGS. 1a-2b, valve assembly 10 also includes a plunger 125, which is generally cylindrical in shape. One embodiment of plunger 125 is shown in detail in FIGS. 5a-5c. FIG. 5a is a cross sectional view of plunger 125, FIG. 5b is a top view, and FIG. 5c is an enlarged view. Plunger 125 includes axial ends 128 and 130 and a cylindrical side wall 132 having a fluid flow path 135 formed therein for allowing fluid transfer between axial ends 128 and 130. Fluid flow path 135 may be a channel, a spiral groove, as shown in FIG. 5a, or it may be a straight groove, a flat channel, or the like. Plunger 125 may be formed of magnetic steel. An intermediate space 150 exists between axial end 120 of plunger 125 and first end 82 of orifice piece 80. A biasing member, such as spring 140, may be positioned between orifice piece 80 and plunger 125, thereby biasing plunger 125 towards magnetic top piece 62 and maintaining intermediate space 150 when valve assembly 10 is in a de-actuated state as shown in FIGS. 1a and 1b. In the embodiment shown in FIGS. 1a and 1b, spring 140 is positioned around narrowed portion 98 of first end 82 of orifice piece 80. A raised projection 145, which includes a flat top surface 146, may be formed at axial end 130 of plunger 125. In the embodiment shown, raised projection 145 has a flat top surface 147 that abuts top wall 110 of magnetic top piece 62, thereby closing off top port 30 when valve assembly 10 is in a de-actuation state. Further, a radial air gap 155 exists between cylindrical side wall 132 of plunger 125 and inner surface 105 of magnetic top piece 62.

A flux conductor 160 is provided to complete valve assembly 10. As illustrated in detail in FIGS. 6a-6d, flux conductor 160 has a unitary C-shape construction. FIGS. 6a, 6b, and 6c are top, perspective, and side views, respectively, of flux conductor 160. FIG. 6d illustrates flux conductor 160 bent as in an assembled configuration. In particular, flux conductor 160 includes a top section 162, a bottom section 165, and a side section 167. Side section 167 is approximately rectangular in shape with curved corners 168 and stepped corners 169. Top section 162 is also substantially rectangular in shape and includes an elongated opening 170 formed therein. A notch 171 may also be formed within a lower surface of top section 162. Projections 172 bend perpendicularly from top section 162 as shown in FIG. 6d to secure flux conductor to valve assembly 10, Bottom section 165 extends from stepped corners 169 and also includes an elongated opening 177. Flux conductor 160 is formed of a metallic material.

The operation of valve assembly 10 will be described in connection with FIGS. 1a and 1b, which illustrate valve assembly in a de-actuated state, and FIGS. 2a and 2b, which illustrate valve assembly in an actuated state. When solenoid coil 75 is not energized, as in FIGS. 1a and 1b, biasing member or spring 140 holds plunger 125 against magnetic top piece 62, thereby closing top port 30. Fluid passes through inlet port 20 and passes through central passageway 86 of orifice piece 80 to intermediate space 150 between plunger 125 and orifice piece 80. The fluid then passes through channel 94 formed on an outside of orifice piece 80 to internal passageway 70 of base 50, which leads to common port 40, where the fluid exits.

When solenoid coil 75 is energized, as shown in FIGS. 2a and 2b, a magnetic field goes around flux conductor 160 so the magnetic field comes through orifice piece 80 and jumps a thin radial air gap 161 that is formed between orifice piece 80 and tubular section 55 of valve base 50. After the magnetic field jumps thin radial air gap 161 it goes around flux conductor 160 and makes contact between flux conductor 160 and magnetic top piece 62 so the magnetic field comes through the side of magnetic top piece 62 and then jumps radial air gap 155 between magnetic top piece 62 and plunger 125. The magnetic field then flows through plunger 125 and then jumps intermediate space 150 between plunger 125 and orifice piece 80, thereby creating a magnetic force that pulls plunger 125 towards orifice piece 80 and compresses spring 140. Depending on the intensity or strength of coil 75, the position of plunger 125 can be held in various positions thus controlling the flow between inlet port 20 and common port 40.

Therefore, when plunger 125 is pulled towards orifice piece 80, a gap 180 is created and top port 30 is opened, as shown in FIGS. 2a and 2b. When top port 30 is opened, part of the flow from inlet port 20 goes to common port 40 and part of the flow goes to top port 30, thereby creating a 3-way flow. Thus, when plunger 125 is biased towards orifice piece 80, but does not contact orifice piece 80, valve assembly 10 can be used as a divider valve since the flow gets divided in 2-ways. As plunger 125 is biased more towards orifice piece 80 such that central passageway 86 is more closed off, then less and less fluid will be flowing from inlet port 20 to common port 40 and more and more fluid will be flowing through top port 30. When plunger 125 is completely in contact with orifice piece 80, completely closing off central passageway 86, flow from inlet port 20 to common port 40 will be cut off and common port 40 and top port 30 will be completely in communication.

Figure 7:
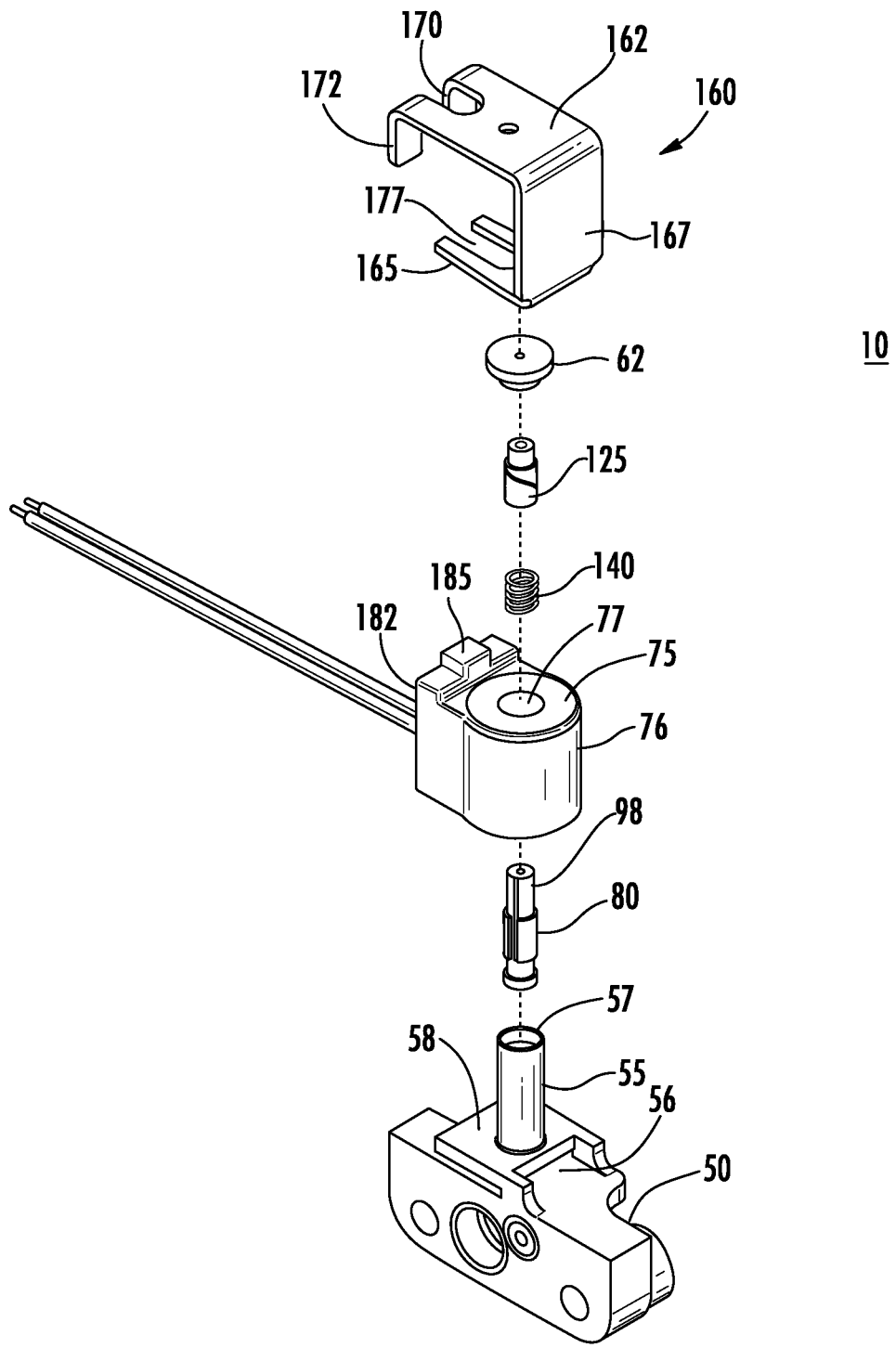
FIG. 7 is an exploded view of a three-way proportional solenoid-controlled fluid valve assembly according to an embodiment of the invention.

FIG. 7 is an exploded view of valve assembly 10 according to one embodiment. During assembly, orifice piece 80 is inserted into longitudinal bore 57 in tubular section 55 of valve base 50. Spring 140 fits over narrowed cylindrical section 98 of orifice piece 80. Solenoid coil 75, installed within housing 76, is positioned over tubular section 55 of base 50, which contains orifice piece 80. In particular, tubular section 55 fits within through hole 77 of solenoid coil housing 76. Plunger 125 is then positioned within through hole 77 of solenoid coil housing 76 such that plunger 125 is positioned adjacent orifice piece 80 with an air gap therebetween, which is maintained by the biasing force of spring 140. Magnetic top piece 62 is then positioned over plunger 125. Flux conductor 160 is then attached to valve assembly 10. Bottom section 165 is slid along valve base 50 through opening 56 such that part of tubular section 55 below platform 58 fits within opening 177 in flux conductor 160. Side section 167 of flux conductor 160 is positioned adjacent to solenoid coil housing 76. Top section 162 abuts magnetic top piece 62, thereby maintaining the assembled configuration of the valve assembly 10. Projections 172 are bent downwards to further engage solenoid coil housing 76 at a flat portion 182 thereof. Solenoid housing 76 may further include a raised section 185 to be received within opening 170 to further secure the valve assembly 10. Flux conductor 160 serves to secure the components of the valve assembly in an assembled configuration without the use of additional fasteners or other securing means.

Figure 8A:
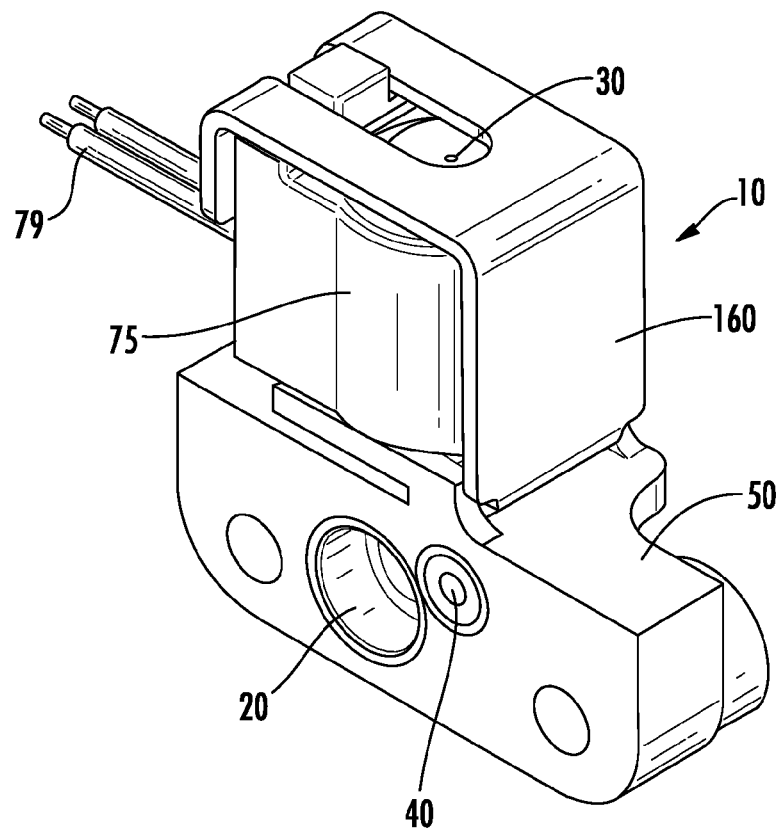
FIG. 8a is a perspective view of a valve assembly.
Figure 8B:
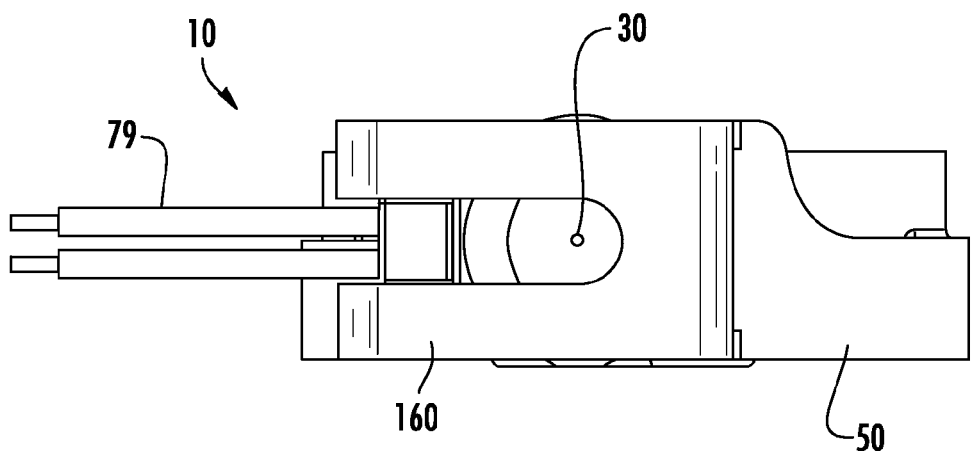
FIG. 8b is a top view of a valve assembly.

FIGS. 8a and 8b illustrate perspective and top views of three-way proportional solenoid-valve assembly 10. As illustrated, flux conductor 160 attaches to valve base 50 and solenoid coil housing 76 to maintain the assembled configuration of valve assembly 10.

Figure 9A:
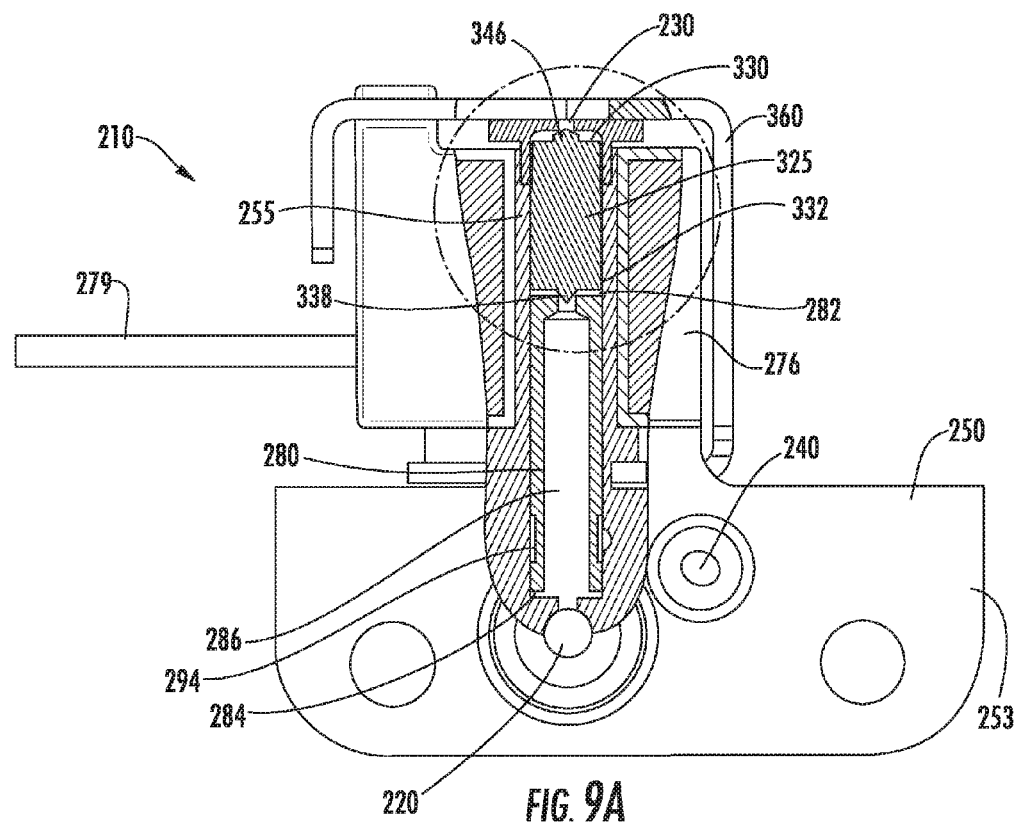
FIG. 9a is a cross-sectional illustration of an alternate embodiment of a three-way solenoid-controlled fluid valve assembly in a de-actuated state.
Figure 9B:
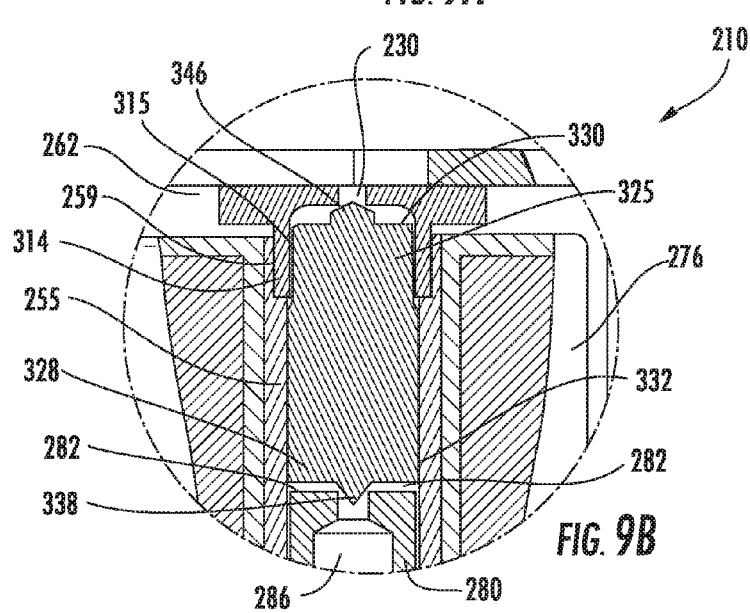
Figure 10A:
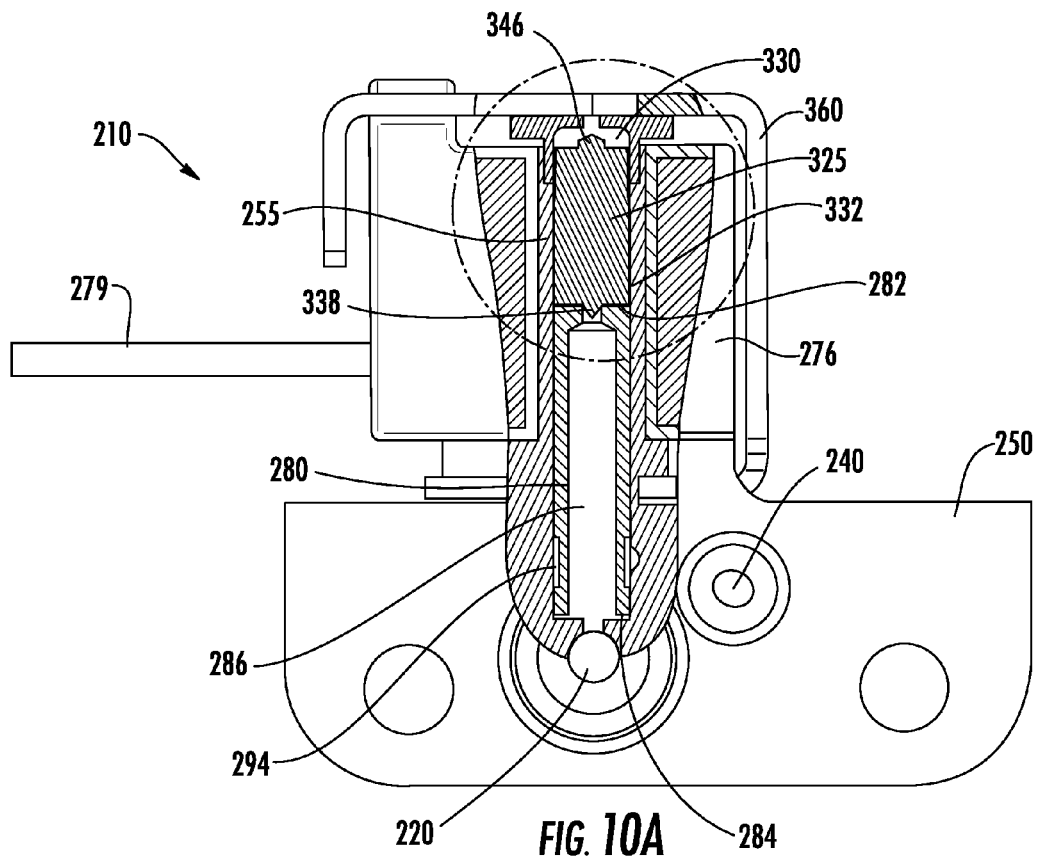
FIG. 10a is a cross-sectional illustration of a three-way solenoid-controlled fluid valve assembly in an actuated state according to an alternate embodiment of the invention.
Figure 10B:
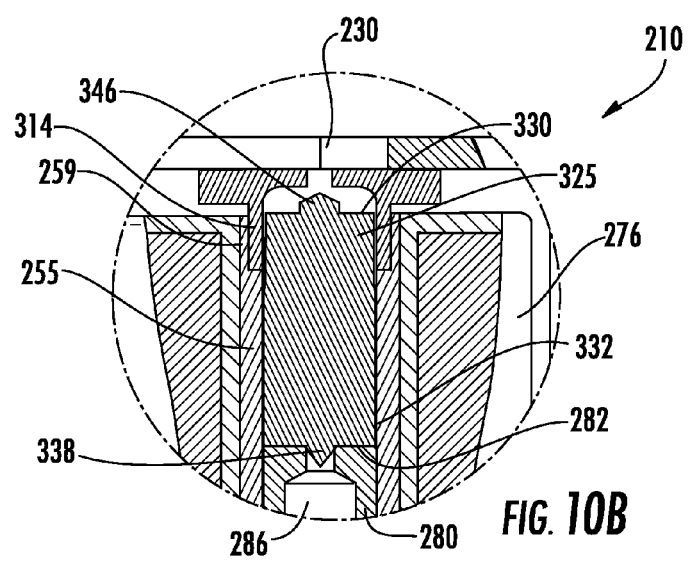

FIGS. 9a-10b, illustrate an alternate embodiment of a three-way solenoid-controlled fluid valve assembly 210. FIGS. 9a and 9b illustrate a cross-sectional view and an enlarged cross-sectional view of valve assembly 210 in a de-actuated state. FIGS. 10a and 10b illustrate a cross-sectional view and an enlarged cross-sectional view of valve assembly 210 in an actuated state. Valve assembly 210 is a three-way on-off valve having three ports including inlet port 220 through which fluid enters valve assembly 210, top port 230, and common port 240 which is common to inlet port 220 and top port 230.

In general, valve assembly 210 includes elements that correspond to those described in connection with FIGS. 1a-2b. For example, valve assembly 210 includes a valve base 250 having a body section 253 and tubular section 255 extending from body section 253 with a longitudinal bore formed therein. Tubular section 255 includes an upwardly extending annular flange 259 and an annular ledge for receiving a magnetic top piece 262.

A solenoid coil is supported on a solenoid coil housing 276 and is adapted to generate a magnetic flux. Housing 276 is connected to electrical leads 279 which supply an electrical connection between the solenoid coil and a current control source (not shown). Further, an orifice piece 280 is positioned within the longitudinal bore of tubular section 255. Orifice piece 280 includes a first end 282 and a second end 284 with a central passageway 286 formed therein. A channel may be formed within an outer surface of orifice piece 280 to allow for fluid transfer from central passageway 286 at first end 282 of orifice piece 280 to common port 240. Orifice piece 280 may further include an annular depression 294 formed therein proximate to second end 284 to further facilitate fluid transfer to common port 240. Orifice piece 280 is formed of a ferromagnetic material.

As described with respect to valve assembly 10, valve assembly 210 similarly includes magnetic top piece 262 positioned over tubular section 255 of valve base 250. In general, magnetic top piece 262 is cylindrically shaped with an inner surface, an outer surface, a top wall with top port 230 formed therein. Magnetic top piece 262 also includes a bottom rim 314 received within upwardly extending annular flange 259 of tubular section 255 of valve base 250.

Valve assembly 210 includes a plunger 325, which is generally cylindrical in shape. Plunger 325 is shown in detail in FIGS. 11a-11c. FIG. 11a is a cross sectional view of plunger 325, FIG. 11b is a top view, and FIG. 11c is a perspective view. Plunger 325 includes axial ends 328 and 330 and a cylindrical side wall 332 having a fluid flow path 335 formed therein for allowing fluid transfer between axial ends 328 and 330. Fluid flow path 335 may be channel or a spiral groove, as shown in FIG. 11a, or it may be a straight groove, a flat channel, or the like. In some embodiments more than one channel may be formed within cylindrical side wall 332. Plunger 325 may be formed of magnetic steel. A raised projection 345, which may include a pointed top surface 346, may be formed at axial end 330 of plunger 325. As shown in FIGS. 9a and 9b, pointed top surface 346 extends into top port 230 when valve assembly is in a de-actuated state, thereby closing off top port 230. Axial end 328 includes a projection 338 formed thereon, which extends into central passageway 286 of first end 282 of orifice piece 280, thereby closing off central passageway 286.

Figure 14A:
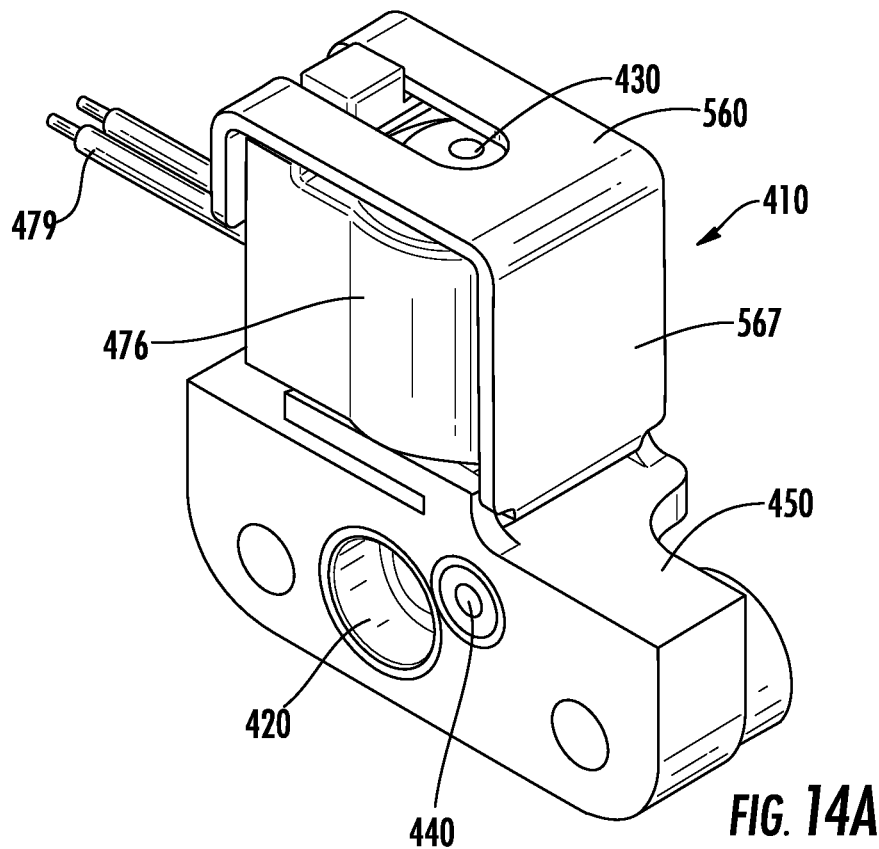
FIG. 14a is a perspective view of the 3-way proportional valve.
Figure 14B:
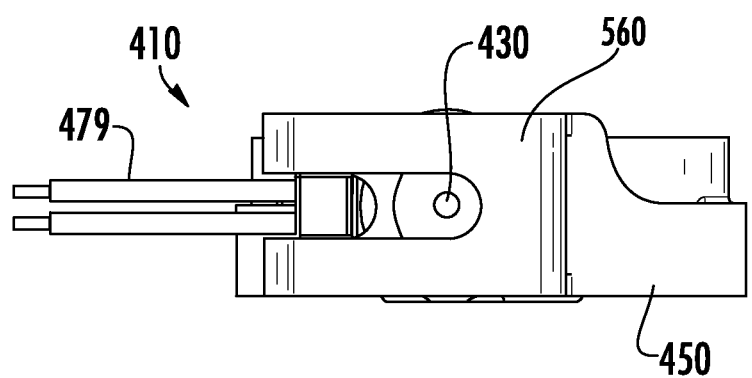
FIG. 14b is a top view of the 3-way proportional valve.
Figure 15:
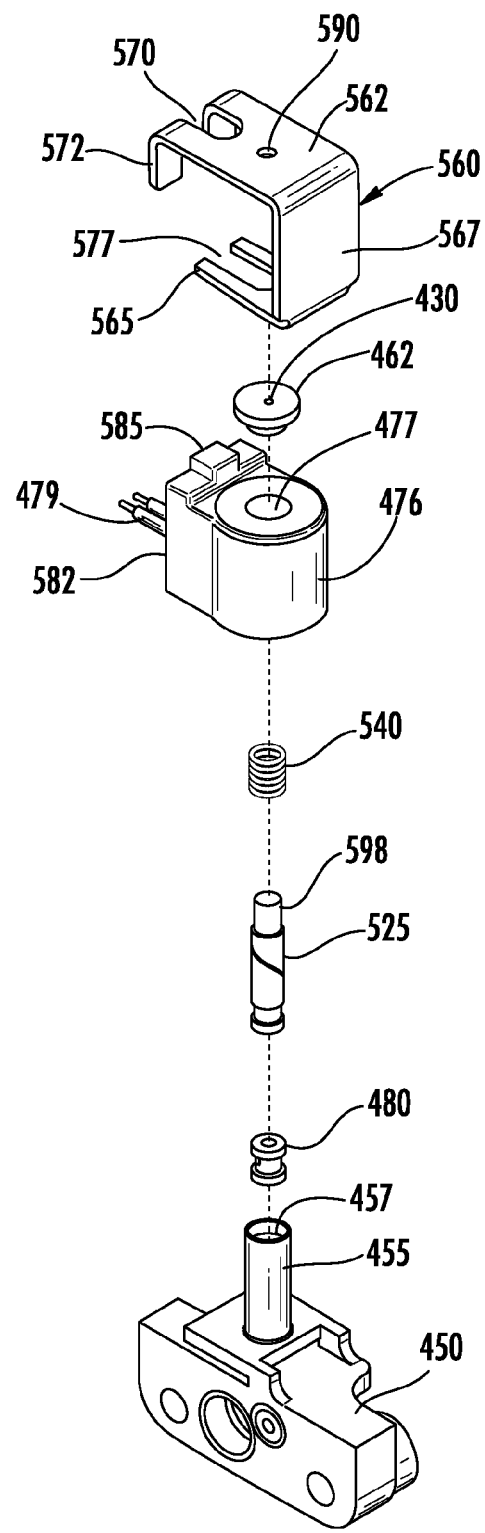
FIG. 15 is an exploded view of the 3-way proportional valve.

FIGS. 12a-15, illustrate an additional embodiment of a three-way proportional solenoid-controlled fluid valve assembly 410. In particular, FIG. 12a is a cross-sectional side view of a a-way proportional valve. FIG. 12b is a detail view of FIG. 12a. FIG. 13a is a cross-sectional side view of the 3-way proportional valve in an open position. FIG. 13b is an enlarged view of FIG. 13a. FIG. 14a is a perspective view of the 3-way proportional valve. FIG. 14b is a top view of the 3-way proportional valve. FIG. 15 is an exploded view of the 3-way proportional valve.

Valve assembly 410 is three-way proportional valve having three ports including inlet port 420 through which fluid enters valve assembly 410, a top port 430, and a common port 440 which common to inlet port 420 and top port 430. Valve assembly 410 is similar to valve assembly 10 and will be described with reference to alternate features only.

Valve assembly 410 includes a magnetic top piece 462 positioned over tubular section 455 of valve base 450. In general, magnetic top piece 462 is cylindrically shaped with a top wall 510 with top port 430, formed therein. Magnetic top piece 462 also includes a bottom rim 514 and a disk-shaped rim portion 517. Bottom rim 514 of magnetic top piece 462 extends below disk-shaped rim portion 517 is received within upwardly extending annular flange 459 of tubular section 455 of valve base 450. Disk-shaped rim portion 517 is adjacent to solenoid coil housing 476 and may abut or is adjacent to upwardly extending annular flange 459. In an assembled configuration, magnetic top piece 462 is held in place by and is in contact with top section 562 of flux conductor 560.

Valve assembly 410 includes a plunger 525, which is generally cylindrical in shape. Plunger 525 is shown in FIGS. 12a-13b and FIG. 15. Plunger 525 includes axial ends 528 and 530 and a cylindrical side wall 532 having a fluid flow path 535 formed therein for allowing fluid transfer between axial ends 528 and 530. Fluid flow path 535 may be a channel or a spiral groove, as shown in FIG. 15, or it may be a straight groove, a flat channel, or the like. Plunger 525 may be formed of magnetic steel. In the embodiment shown, axial end 528 includes a flat surface and axial end 530 includes a projection 538, as shown in FIG. 12b, for extending into and sealing central passageway 486 of orifice piece 480 when valve assembly 410 is in a closed position.

A biasing member, such as spring 540, is positioned between plunger 525 and magnetic top piece 462, thereby biasing plunger 525 towards orifice piece 480 and maintaining space 550 when valve assembly 10 is in a de-actuated state as shown in FIGS. 12a and 12b. In the embodiment shown in FIGS. 12a and 12b, spring 540 is positioned around a narrowed portion 598 plunger 525. Further, a radial air gap 555 exists between a cylindrical side wall of plunger 525 and an inner surface of magnetic top piece 462. A flux conductor 560 is provided to complete valve assembly 410. During proportional control of 3-way valve assembly 410, force is generated between plunger 525 and magnetic top piece 462 resulting in plunger 525 lifting off orifice piece 480 and acting against the force of spring 540, thereby creating gap 552. As shown in FIGS. 13a and 13b. Orifice piece 480 is formed of a non-magnetic material.

FIGS. 14a and 14b are assembled views and FIG. 15 is an exploded view of valve assembly 410 according to one embodiment. During assembly, orifice piece 480 is inserted into longitudinal bore 457 in tubular section 455 of valve base 450. Plunger 525 is then positioned within through longitudinal bore 457 such that plunger 525 is positioned adjacent orifice piece 480. Spring 540 fits over narrowed cylindrical section 598 of plunger 525. A solenoid coil, installed within housing 476, is positioned over tubular section 455 of base 450. In particular, tubular section 455 fits within through hole 477 of solenoid coil housing 476. Housing 476 is connected to electrical leads 479 which supply an electrical connection between the solenoid coil and a current control source (not shown). Magnetic top piece 462 is then positioned over plunger 525 with an air gap therebetween, which is maintained by the biasing force of spring 540. Flux conductor 560 may then be attached to valve assembly 410. Bottom section 565 is slid along valve base 450 through opening 456 such that part of tubular section 455 below platform 458 fits within opening 577 in flux conductor 560. Side section 567 of flux conductor 560 is positioned adjacent to solenoid coil housing 476 as shown in FIG. 14a. Top section 562 abuts magnetic top piece 462, thereby maintaining the assembled configuration of the valve assembly 410. Projections 572 are bent downwards to further engage solenoid coil housing 476 at a flat portion 582 thereof. Solenoid housing 476 may further include a raised section 585 to be received within opening 570 to further secure the valve assembly 410. A top aperture 590 is formed in flux conductor 560 for aligning with top port 430. Flux conductor 560 serves to secure the components of the valve assembly in an assembled configuration without the use of additional fasteners or other securing means.

Figure 16A:
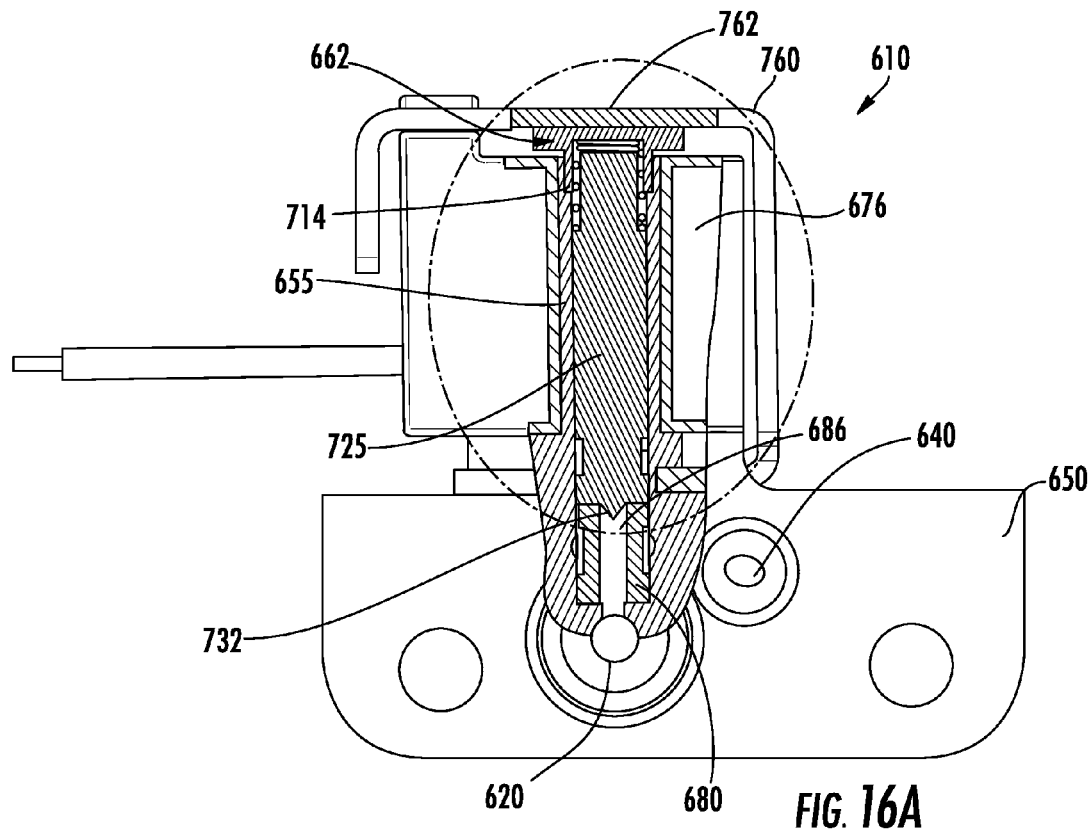
FIG. 16a is a cross-sectional side view of a 2-way proportional valve.
Figure 17A:
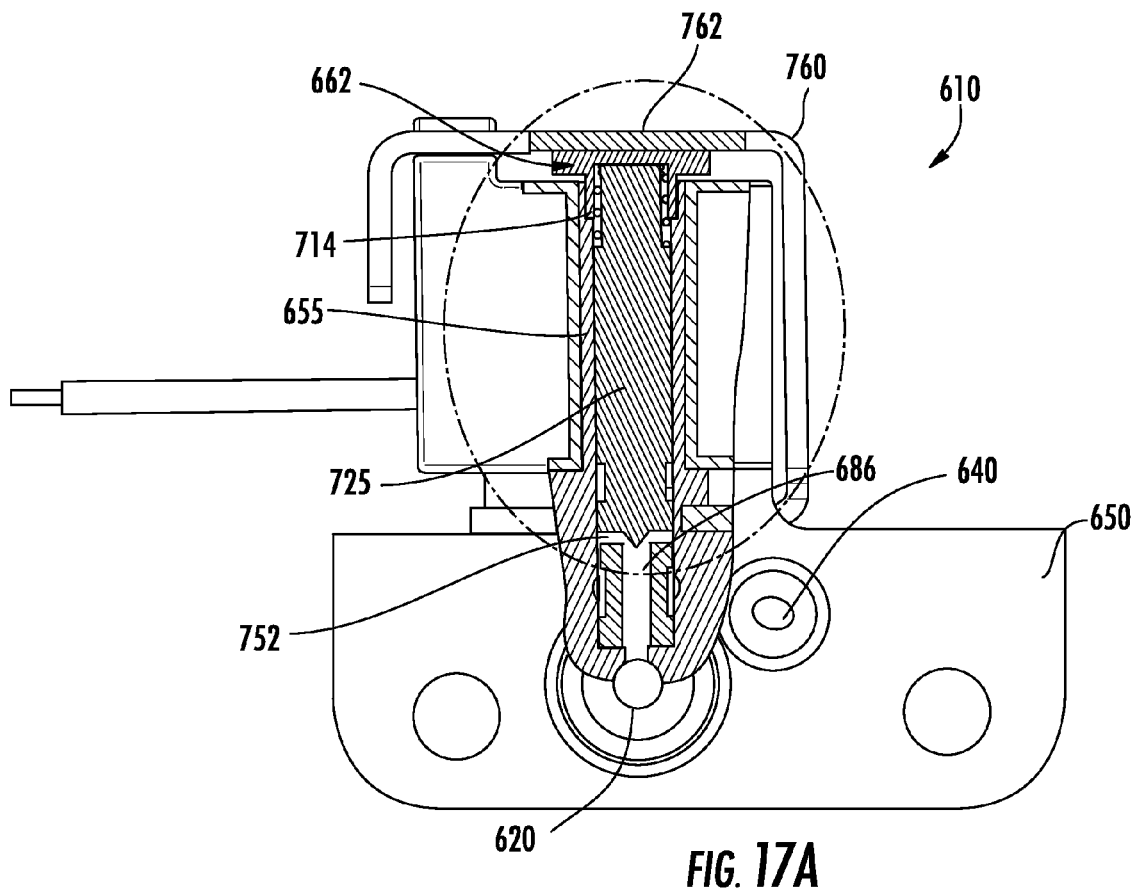
FIG. 17a is a cross-sectional side view of the 2-way proportional valve in an open position.
Figure 17B:
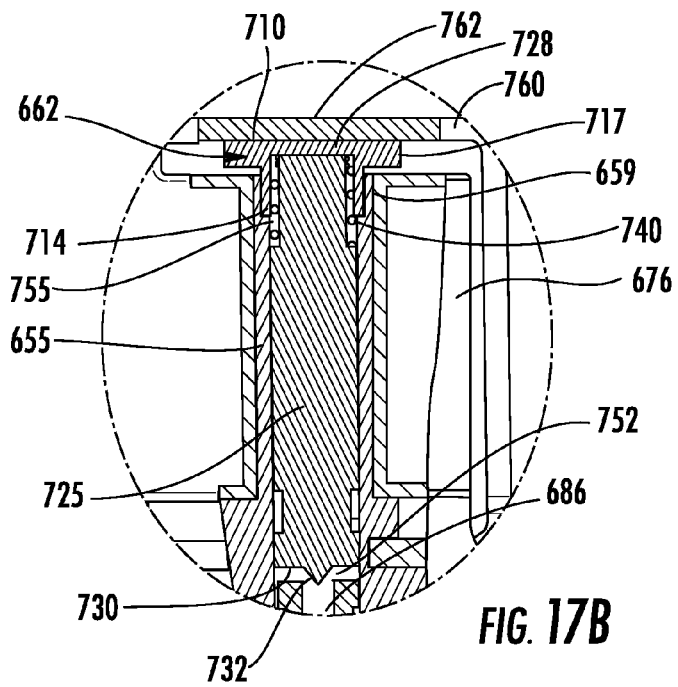
FIG. 17b is an enlarged view of FIG. 16c.
Figure 18A:
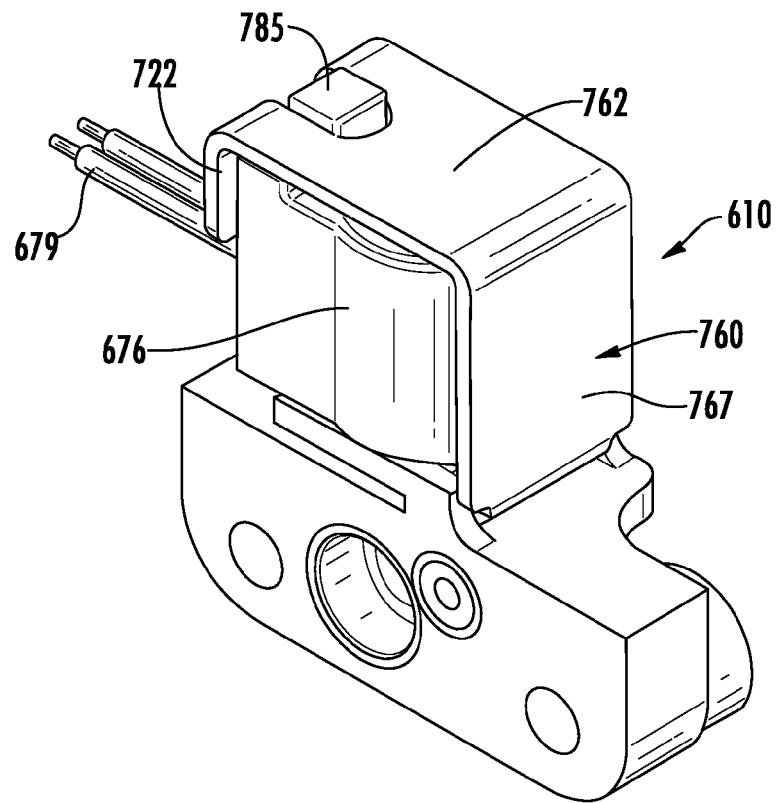
FIG. 18a is a perspective view of the 2-way proportional valve.
Figure 18B:
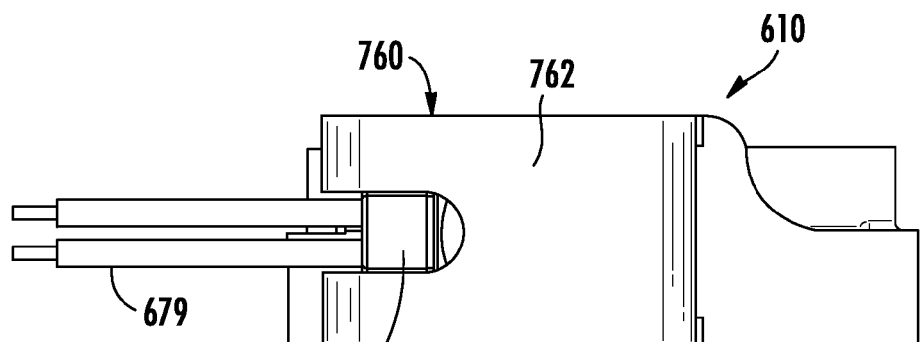
FIG. 18b is a top view of the 2-way proportional valve.
Figure 19:
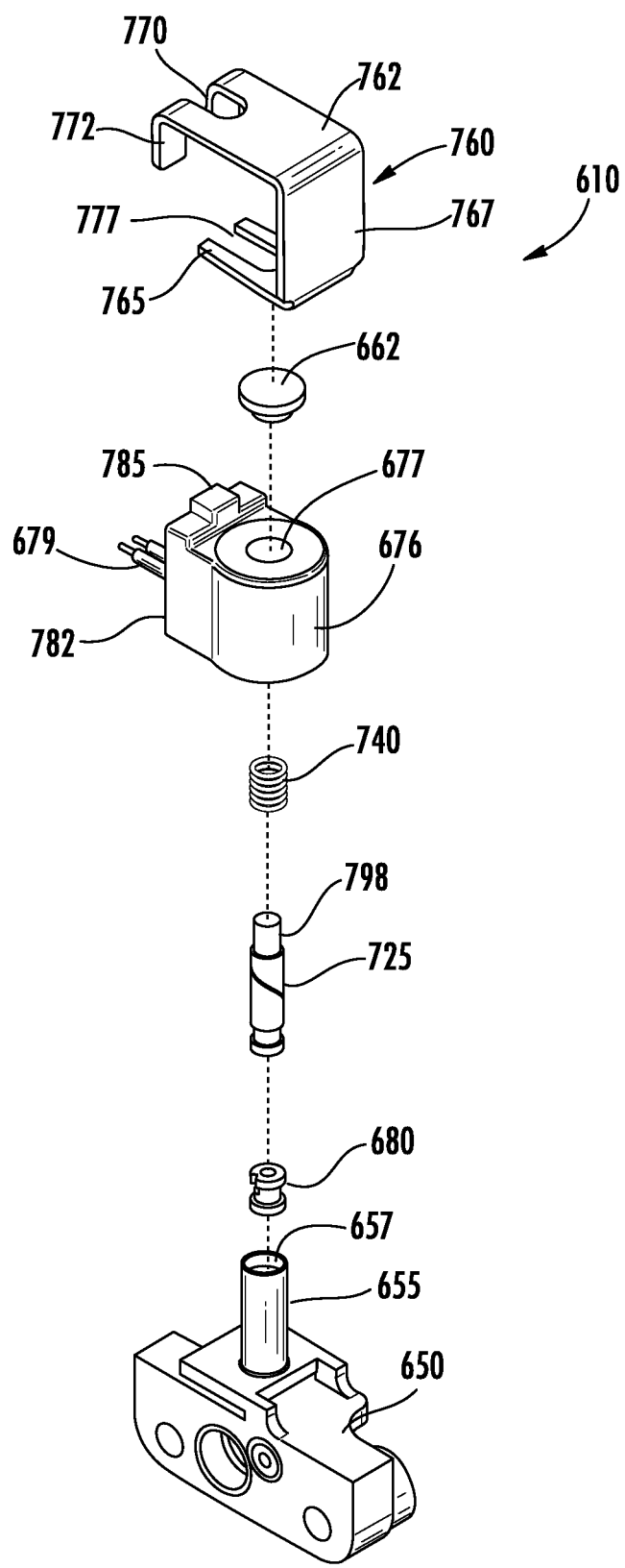
FIG. 19 is an exploded view of the 2-way proportional valve.

FIGS. 16a-19 illustrate a 2-way, normally closed, proportional valve 610. In particular, FIG. 16a is a cross-sectional side view of 2-way proportional valve 610. FIG. 16b is a detail view of FIG. 16a. FIG. 17a is a cross-sectional side view of 2-way proportional valve 610 in an open position. FIG. 17b is an enlarged view of FIG. 17a. FIG. 18a is a perspective view of the 2-way proportional valve. FIG. 18b is a top view of the 2-way proportional valve. FIG. 19 is an exploded view of the 2-way proportional valve.

Valve assembly 610 is a two-way proportional valve having two ports including inlet port 620 through which fluid enters valve assembly 610 and an outlet port 640. Valve assembly 610 includes a magnetic top piece 662 positioned over tubular section 655 of valve base 650. In general, magnetic top piece 662 is cylindrically shaped with a solid top wall 710. Magnetic top piece 662 also includes a bottom rim 714 and a disk-shaped rim portion 717. Bottom rim 714 of magnetic top piece 662 extends below disk-shaped rim portion 717 is received within upwardly extending annular flange 659 of tubular section 655 of valve base 650. Disk-shaped rim portion 717 is adjacent to solenoid coil housing 676 and may abut or is adjacent to upwardly extending annular flange 659. In an assembled configuration, magnetic top piece 662 is held in place by and is in contact with top section 762 of flux conductor 760.

Valve assembly 610 includes a plunger 725, which is generally cylindrical in shape. Plunger 725 includes axial ends 728 and 730 and a cylindrical side wall 732. Plunger 725 may be formed of magnetic steel. In the embodiment shown, axial end 728 includes a flat surface and axial end 730 includes a projection 738, as shown in FIG. 16b, for extending into and sealing central passageway 686 of orifice piece 680 when valve assembly 610 is in a closed position.

Figure 16B:
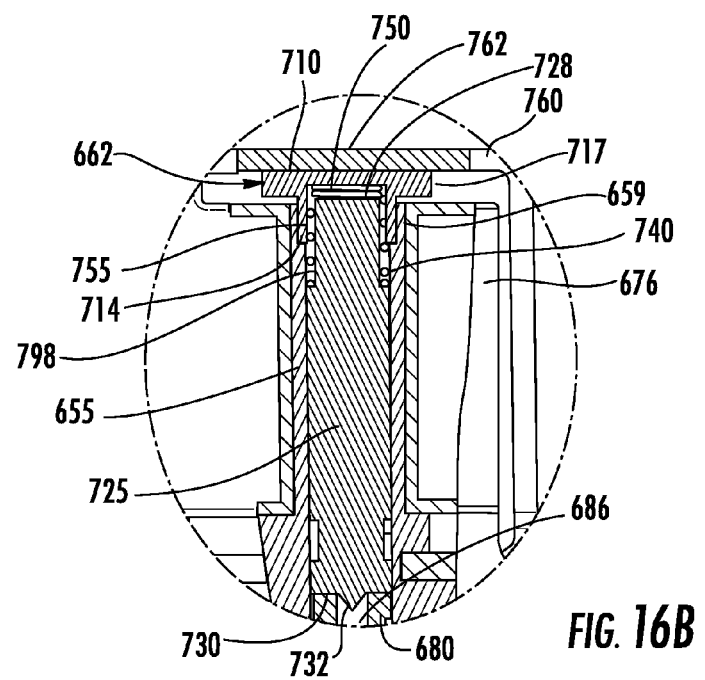

A biasing member, such as spring 740, is positioned between plunger 725 and magnetic top piece 662, thereby biasing plunger 725 towards orifice piece 680 and maintaining space 750 when valve assembly 610 is in a de-actuated state as shown in FIGS. 16a and 16b. In the embodiment shown in FIGS. 16a and 16b, spring 740 is positioned around a narrowed portion 798 plunger 725. Further, a radial air gap 755 exists between a cylindrical side wall of plunger 725 and an inner surface of magnetic top piece 662. A flux conductor 760 is provided to complete valve assembly 610. During proportional control of 2-way valve assembly 610, force is generated between plunger 725 and magnetic top piece 662 resulting in plunger 725 lifting off orifice piece 680 and acting against the force of spring 740, thereby creating gap 752. As shown in FIGS. 17a and 17b. Orifice piece 680 is formed of a non-magnetic material. Flux conductor 760 serves to secure the components of the valve assembly in an assembled configuration without the use of additional fasteners or other securing means.

FIGS. 18a and 18b are assembled views and FIG. 19 is an exploded view of valve assembly 610 according to one embodiment. During assembly, orifice piece 680 is inserted into longitudinal bore 657 in tubular section 655 of valve base 650. Plunger 725 is then positioned within through longitudinal bore 657 such that plunger 725 is positioned adjacent orifice piece 680. Spring 740 fits over narrowed cylindrical section 798 of plunger 725. A solenoid coil, installed within housing 676, is positioned over tubular section 655 of base 650. In particular, tubular section 655 fits within through hole 677 of solenoid coil housing 676. Housing 676 is connected to electrical leads 679 which supply an electrical connection between the solenoid coil and a current control source (not shown). Magnetic top piece 662 is then positioned over plunger 725 with an air gap therebetween, which is maintained by the biasing force of spring 740. Flux conductor 760 may then be attached to valve assembly 610. Bottom section 765 is slid along valve base 650 through opening 656 such that part of tubular section 655 below platform 658 fits within opening 777 in flux conductor 760. Side section 767 of flux conductor 760 is positioned adjacent to solenoid coil housing 676 as shown in FIG. 18*a*. Top section 762 abuts magnetic top piece 662, thereby maintaining the assembled configuration of the valve assembly 610. Projections 772 are bent downwards to further engage solenoid coil housing 676 at a flat portion 782 thereof. Solenoid housing 676 may further include a raised section 785 to be received within opening 770 to further secure the valve assembly 610 and restrict rotation of solenoid coil housing 676.

Although, for convenience, the invention has been described primarily with reference to several specific embodiments, it will be apparent to those of ordinary skill in the art that the valve and the components thereof can be modified without departing from the spirit and scope of the invention as claimed.

The invention claimed is:

1. A valve assembly comprising:
   a unitary valve base including a body section and an upstanding tubular section extending therefrom with a longitudinal bore formed therein, said body section including a fluid inlet port and a common port with an internal passageway therebetween;
   a solenoid coil housing, having a longitudinal axis and a bore coaxial therewith;
   an orifice piece positioned within the longitudinal bore of the valve base, said orifice piece defining a central passageway and having a first end and a second end, wherein a channel is formed between an outer surface of the orifice piece and said longitudinal bore to allow fluid transfer from the central passageway at the first end of the orifice piece to the common port of the valve base;
   a magnetic top piece positioned over a top open end of the tubular section;
   a plunger having a first end, a second end, an outer surface and a fluid flow path formed between said first end and said second end, said plunger positioned partially within the longitudinal bore of the valve base and partially within the magnetic top piece, said plunger being movable within the longitudinal bore of the valve base and the magnetic top piece between a de-actuated position and an actuated position; and
   a flux conductor for securing the valve assembly in an assembled configuration;
   wherein said fluid flow path is a groove formed in the outer surface of the plunger and said magnetic top piece includes a top port formed therein and said first end of said plunger is adapted to abut said magnetic top piece thereby closing off the top port and preventing fluid from flowing through the top port, and wherein the magnetic top piece abuts a top open end of the tubular section.

2. The valve assembly according to claim 1, further comprises a biasing member for biasing the plunger so it closes the top port when the valve is in a de-actuated state.

3. The valve assembly according to claim 1, further comprises a biasing member for biasing the plunger so it contacts the first end of the orifice piece when the valve is in a de-actuated state.

4. The valve assembly according to claim 1, wherein the magnetic top piece is cylindrically shaped with an inner surface, an outer surface, a top wall with said top port formed therein, a bottom rim and a disk-shaped rim portion extending from said outer surface, wherein the outer surface of the plunger is adjacent to the inner surface of the magnetic top piece and an inner surface of the upstanding tubular section of the unitary valve base with a radial air gap between said inner surface of the magnetic top piece and an outer surface of said plunger.

5. The valve assembly of claim 4, wherein the base further includes an upwardly extending flange extending from the tubular section, said upwardly extending flange forming an annular pocket into which said bottom rim of the magnetic top piece is received, wherein said disk-shaped rim portion is adjacent to said upwardly extending flange.

6. The valve assembly according to claim 1, wherein the solenoid coil housing surrounds said tubular section of the valve base.

7. The valve assembly according to claim 1, wherein the flux conductor has a unitary C-shape construction with a top section, a bottom section, and a side section, wherein the bottom section is adapted to slide along the valve base to be secured within an opening in the valve base such that a portion of the tubular section of the valve base fits within an opening in the flux conductor.

8. The valve assembly of claim 7, wherein the solenoid coil housing includes a raised section to be received within an opening in the top section of the flux conductor to further secure the valve assembly and restrict rotation of the solenoid coil housing.

9. A valve assembly comprising:
   a unitary valve base including a body section and an upstanding tubular section extending therefrom with a longitudinal bore formed therein, said body section including a fluid inlet port and a common port with an internal passageway therebetween;
   a solenoid coil housing, having a longitudinal axis and a bore coaxial therewith;
   an orifice piece positioned within the longitudinal bore of the valve base, said orifice piece defining a central passageway and having a first end and a second end, wherein a channel is formed between an outer surface of the orifice piece and said longitudinal bore to allow fluid transfer from the central passageway at the first end of the orifice piece to the common port of the valve base;
   a magnetic top piece abuts a top open end of the tubular section, said magnetic top piece including a top port formed therein;
   a plunger having a first end, a second end, an outer surface and a fluid flow path formed between said first end and said second end, said fluid flow path being a groove formed in the outer surface of the plunger said plunger positioned partially within the longitudinal bore of the valve base and partially within the magnetic top piece, said plunger being movable within the longitudinal bore of the valve base and the magnetic top piece between a de-actuated position and an actuated position;
   wherein said first end of said plunger is adapted to abut said magnetic top piece thereby closing off the top port and preventing fluid from flowing through the top port;
   a flux conductor for securing the valve assembly in an assembled configuration; and
   a biasing member for biasing the plunger so it contacts the first end of the orifice piece when the valve is in a de-actuated state.

10. The valve assembly according to claim 9, wherein the magnetic top piece is cylindrically shaped with an inner surface, an outer surface, a top wall with said top port formed therein, a bottom rim and a disk-shaped rim portion extending from said outer surface, wherein the outer surface of the plunger is adjacent to the inner surface of the magnetic top piece and an inner surface of the upstanding tubular section of the unitary valve base with a radial air gap between said inner surface of the magnetic top piece and an outer surface of said plunger.

11. The valve assembly of claim 10, wherein the base further includes an upwardly extending flange extending from the tubular section, said upwardly extending flange forming an annular pocket into which said bottom rim of the magnetic top piece is received, wherein said disk-shaped rim portion is adjacent to said upwardly extending flange.

12. The valve assembly according to claim 9, wherein the solenoid coil housing surrounds said tubular section of the valve base.

13. The valve assembly according to claim 9, wherein the flux conductor has a unitary C-shape construction with a top section, a bottom section, and a side section, wherein the bottom section is adapted to slide along the valve base to be secured within an opening in the valve base such that a portion of the tubular section of the valve base fits within an opening in the flux conductor.

14. The valve assembly of claim 13, wherein the solenoid coil housing includes a raised section to be received within an opening in the top section of the flux conductor to further secure the valve assembly and restrict rotation of the solenoid coil housing.

15. A valve assembly comprising:
a unitary valve base including a body section and an upstanding tubular section extending therefrom with a longitudinal bore formed therein, said body section including a fluid inlet port and a common port with an internal passageway therebetween;
a solenoid coil housing, having a longitudinal axis and a bore coaxial therewith;
an orifice piece positioned within the longitudinal bore of the valve base, said orifice piece defining a central passageway and having a first end and a second end, wherein a channel is formed between an outer surface of the orifice piece and said longitudinal bore to allow fluid transfer from the central passageway at the first end of the orifice piece to the common port of the valve base;
a magnetic top piece positioned over a top open end of the tubular section, said magnetic top piece including a top port formed therein;
a plunger having a first end, a second end, an outer surface and a fluid flow path formed between said first end and said second end, said plunger positioned partially within the longitudinal bore of the valve base and partially within the magnetic top piece, said plunger being movable within the longitudinal bore of the valve base and the magnetic top piece between a de-actuated position and an actuated position;
wherein said first end of said plunger is adapted to abut said magnetic top piece thereby closing off the top port and preventing fluid from flowing through the top port;
a flux conductor for securing the valve assembly in an assembled configuration; and
a biasing member for biasing the plunger so it closes the top port when the valve is in a de-actuated state, wherein the magnetic top piece is cylindrically shaped with an inner surface, an outer surface, a top wall with said top port formed therein, a bottom rim and a disk-shaped rim portion extending from said outer surface, the outer surface of the plunger is adjacent to the inner surface of the magnetic top piece and an inner surface of the upstanding tubular section of the unitary valve base with a radial air gap between said inner surface of the magnetic top piece and an outer surface of said plunger.

16. The valve assembly of claim 15, wherein the base further includes an upwardly extending flange extending from the tubular section, said upwardly extending flange forming an annular pocket into which said bottom rim of the magnetic top piece is received, wherein said disk-shaped rim portion is adjacent to said upwardly extending flange.

17. The valve assembly according to claim 15, wherein the flux conductor has a unitary C-shape construction with a top section, a bottom section, and a side section, wherein the bottom section is adapted to slide along the valve base to be secured within an opening in the valve base such that a portion of the tubular section of the valve base fits within an opening in the flux conductor, wherein the flux conductor secures components of the valve assembly in an assembled configuration.

18. The valve assembly of claim 17, wherein the solenoid coil housing includes a raised section to be received within an opening in top section of the flux conductor to further secure the valve assembly and restrict rotation of the solenoid coil housing.

* * * * *